United States Patent [19]
Zhou et al.

[11] Patent Number: 5,329,235
[45] Date of Patent: Jul. 12, 1994

[54] METHOD FOR PROCESSING SIGNALS FROM AN MWD ELECTROMAGNETIC RESISTIVITY LOGGING TOOL

[75] Inventors: Qiang Zhou; Donald J. Hilliker, both of Houston; David F. Norwood, Nassau Bay, all of Tex.

[73] Assignee: Western Atlas International, Inc., Houston, Tex.

[21] Appl. No.: 970,093

[22] Filed: Nov. 2, 1992

[51] Int. Cl.$^5$ .......................... G01V 3/38; G01V 3/18
[52] U.S. Cl. ...................................... 324/338; 324/369
[58] Field of Search ....................... 324/338, 339, 369; 364/422

[56] References Cited

U.S. PATENT DOCUMENTS 4,471,436  9/1984  Schaefer et al. .................... 364/422

OTHER PUBLICATIONS

Zhou, Q.; Hilliker, D. J.; Norwood, D.; Geometric Factor and Adaptive Deconvolution of MWD-PWR Tools, The Log Analyst, Jul.-Aug. '92, pp. 390–398.

Zhou, Q., Hilliker, D. J., MWD Resistivity Tool Response In A Layered Medium, Geophysics, vol. 56, No. 11 (Nov. 1991), pp. 1738–1748.

*Primary Examiner*—Walter E. Snow
*Attorney, Agent, or Firm*—William A. Knox

[57] ABSTRACT

This invention discloses an adaptive deconvolution method for enhancing the vertical resolution of an MWD (measurement-while-drilling) electromagnetic resistivity logging tool. The tool measures the total differences between the voltages induced in a pair of spaced-apart receiver coils. A deconvolution filter, appropriate to the current position of the logging tool in the borehole, is derived according to the weighted average of the measured phase differences. Using the so-derived deconvolution filter, the measured phase differences are spatially deconvolved thereby to enhance the vertical resolution of the measurements by reducing the shoulder-bed effects.

9 Claims, 4 Drawing Sheets

METHOD FOR PROCESSING SIGNALS FROM AN MWD ELECTROMAGNETIC RESISTIVITY LOGGING TOOL

BACKGROUND OF THE INVENTION

1. Field of the Invention

This invention teaches use of an adaptive deconvolution method for enhancing the vertical resolution of an MWD (measurement while drilling) electromagnetic logging tool.

2. Discussion of Related Art

Wireline induction logging tools are well known in the art of studying the formation characteristics of the earth through which a borehole has been drilled. Typically, a sonde, carrying one or more transmitting coils and one or more receiving coils, is lowered into the borehole on the end of a multi-conductor cable. An AC signal, at a frequency on the order of 20 kHz excites the transmitter coil. Radiation from the transmitter generates an electromagnetic field in the formation which, in turn, induces a flow of eddy currents therein. Variations in the magnitude of the eddy currents due to variations in the formation conductivity (or its inverse, resistivity) are detected by the receivers. The magnitude of formation conductivity is diagnostic of certain parameters of the earth layers that were penetrated by the borehole. Although other types of tools are known for measuring resistivity, induction tools are preferred in many cases for operational reasons.

A quantitative measure of the conductivity is determined by measuring the value of the voltage induced in the receiver coil that is in-phase with the transmitter current (the real or R component). The real signal is a nonlinear function of conductivity. A quadrature component (X-component) signal can also be measured and be combined with the real component such that the resulting value is a linear function of conductivity.

The term "vertical geometric factor" (VGF), or the impulse response is used by those skilled in the art to describe the response of an induction tool to a thin conductive layer. The impulse response of a typical induction tool in a homogeneous formation is a curve that has a main lobe of finite width that spans a length of the borehole and an amplitude that is an inverse non-linear function of the formation conductivity (N.B. the unit of measurement for conductivity is mho and for borehole applications, 0.001 mho or mmho. Some authors use units of resistivity which are measured in ohm-meters. The terms are often used interchangeably). Although most of the signal originates from the main lobe, unwanted side lobes of non-zero amplitudes extend vertically above and beneath the main lobe.

In thin beds of low conductivity, the unwanted contribution of the side lobes from adjacent beds that have higher conductivity, will cause the thin-bed measurements to be too high. That error is called the "shoulder effect".

As before stated, the magnitude of impulse response of the induction logging tool is an inverse function of formation conductivity but that function is non-linear. The non-linearity is referred to as the "skin effect". The magnitude of the skin effect is also a complex function of the system operating frequency and coil separation.

Various methods have been used in the prior-art borehole logging sondes to counteract the problems cited. For example, see U.S. Pat. No. 4,471,436, issued Sep. 11, 1984 to R. T. Schaefer et al. for PHASOR PROCESSING OF INDUCTION LOGS INCLUDING SHOULDER AND SKIN EFFECTS. Shoulder effect is reduced by generating a spatial deconvolution filter which sharpens the main lobe and reduces the side lobes when the filter is convolved with the VGF. The skin effect is reduced by filtering the quadrature phase component measurements according to a non-linear spatial filtering function to obtain a correction representative of the change in sonde response function as a function of the formation conductivity. The correction component measurements are then summed with the processed in-phase component measurement to produce a processed log measurement sans the unwanted side-lobe contributions.

There are certain technical differences between wireline logging tools as described above and tools used in measurement-while-drilling (MWD). In the latter case, the transmitter and receiving coils of the tool are mounted on a highly-conductive metal mandrel to withstand the drilling stresses during operation. The physical configuration of the conductive mandrel and the transmitter/receiver coils requires that the coils be excited at a frequency on the order of MHz. This tool is thus also named as a propagated wave resistivity tool. Whereas the prior-art wireline tools depended upon a combination of the real and quadrature components to derive apparent conductivity, the propagated wave resistivity tool of this invention relies on the phase difference between the measured signals in the two receiver coils. Therefore, the way of evaluating the VGF impulse response function for MWD is different from that for wireline induction application. See for example *MWD Resistivity Tool Response In A Layered Medium*, by Q. Zhou et al., Geophysics, November 1991, pp. 1738-1748. Also *Geometric Factor and Adaptive Deconvolution of MWD-PWR Tools*, by Q. Zhou et al., The Log Analyst, July-August, 1992 pp. 390-398.

SUMMARY OF THE INVENTION

In accordance with this invention, a propagated wave resistivity tool measures the phase differences between the voltages induced in two receiver coils as the electromagnetic wave propagates through the formation volume to which the tool is responsive. The measured phase differences are averaged to determine a background phase. A deconvolution filter appropriate to the current position of the tool in the formation volume of interest is derived based upon the averaged value of the phase differences which may be a weighted average. The measured phase differences are spatially deconvolved thereby to enhance the vertical resolution of the measurements by reducing the shoulder effects.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DESCRIPTION OF THE PREFERRED EMBODIMENT

Figure 1A:
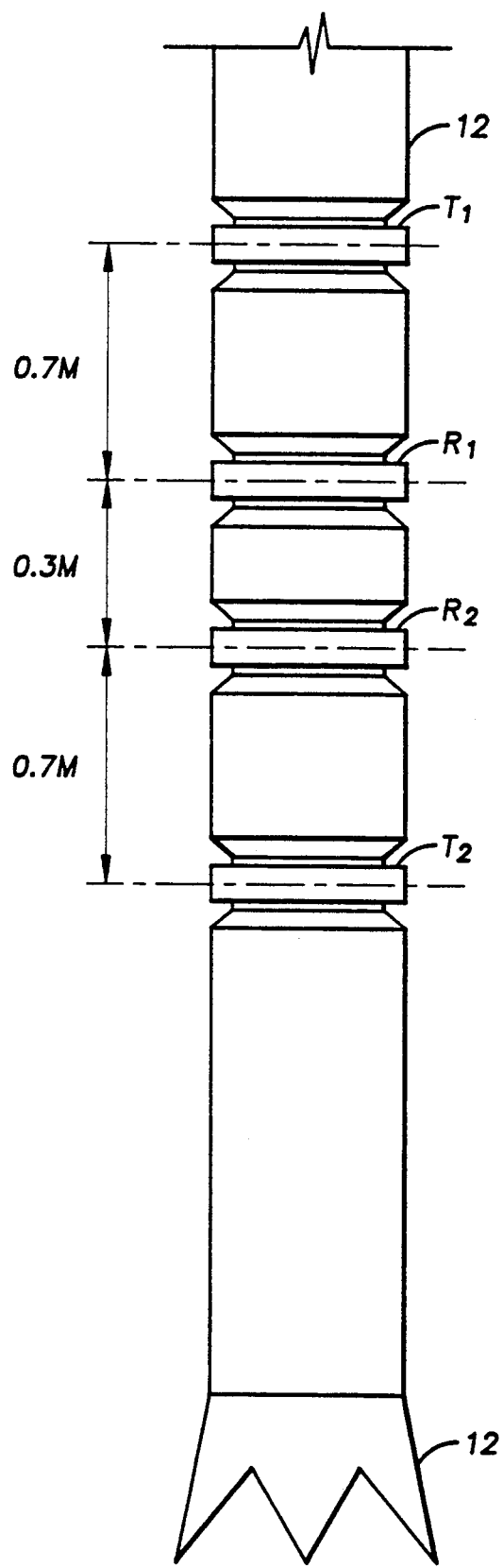
FIG. 1a illustrates an MWD logging tool.
Figure 1B:
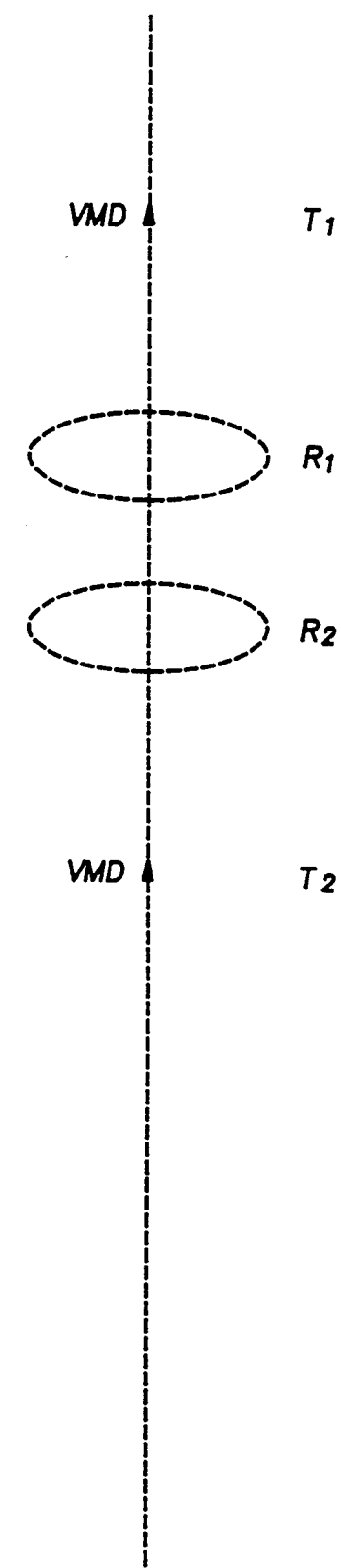
FIG. 1b is an electrical equivalent of two transmitter coils and two receiver coils.

With reference to FIG. 1a, there is shown the lower end 10 of an MWD tool as employed in drilling a borehole. The tool consists of a mandrel 10 about 6.75" in diameter and which is usually made of non-magnetic alloy. A drill bit 12 is screwed to the bottom of the mandrel in a manner well known in the art. Transmitter coils or antennas $T_1$ and $T_2$ are wound in suitable grooves that are 1.7 meters apart. Receiver coils or antennas $R^1$ and $R_2$ that are themselves spaced apart by 0.3 meter are mounted 0.7 meter from the respective transmitter antennas. For an MWD tool, the transmitter antennas are alternately excited at an excitation frequency of 1 MHz. The electromagnetic equivalent of the tool approximates a vertical magnetic dipole (VMD) as shown in FIG. 1b. The formation volume to which the tool is primarily responsive is the spatial interval encompassed by the receiving antennas or coils. The point of measurement is usually taken as the midpoint between the receiver coils or antennas.

The propagated wave resistivity tool of this invention measures the change in phase between the voltages induced in two spaced-apart receiver antennas as an electromagnetic field, launched from a transmitter antenna, propagates through the surrounding formation between the antennas, the electromagnetic field being guided by the conductive mandrel.

For simplicity of the mathematic expressions, one transmitter and one receiver will be assumed. In an azimuthally symmetric formation, it can be shown that the geometric factor for phase and amplitude is given by:

$$g(r;r_R,r_T) = \frac{1}{C} \frac{E^p(r,r_T)G(r_R,r)}{E^p(r_R,r_T)}, \quad (1)$$

where:

$E^p(r,r_T)$ = the electric field in the azimuthal direction for a source at $r_T$ and observation point at r, $E^p(r_R,r_T)$ = the electric field in the azimuthal direction for a source at $r_T$ and receiver point at $r_R$, $G(r_R,r)$ = Green's function relating the eddy current at r to the field at $r_R$, and C = a normalizing constant that depends upon the tool geometry and is given by $$C = (\omega\mu L^2)/2. \quad (2)$$

Under the dipole approximation of the coils, $$g(r;r_R,r_T) = i\frac{L}{2} \frac{r^3}{R_R{}^3 R_T{}^3} \frac{(1 - ik_0 R_T)(1 - ik_0 R_R)}{(1 - ik_0 L)} \times e^{ik_0(RT+RR-L)}. \quad (3)$$

In the above formulations,

L = coil separation, $k_0{}^2 = i\omega\mu\sigma_0$, $\mu$ = magnetic permeability of formation in air, $\sigma_0$ = formation background conductivity, $\omega$ = angular frequency.

The vertical geometric factor $g_v$ for phase can be derived by integrating the imaginary part of $g(r; r_R, r_T)$ from equation (1) over the radius from zero to infinity:

$$g_v = \int_0^\infty Im(g(r;r_R,r_T))dr. \quad (4)$$

Figure 2:
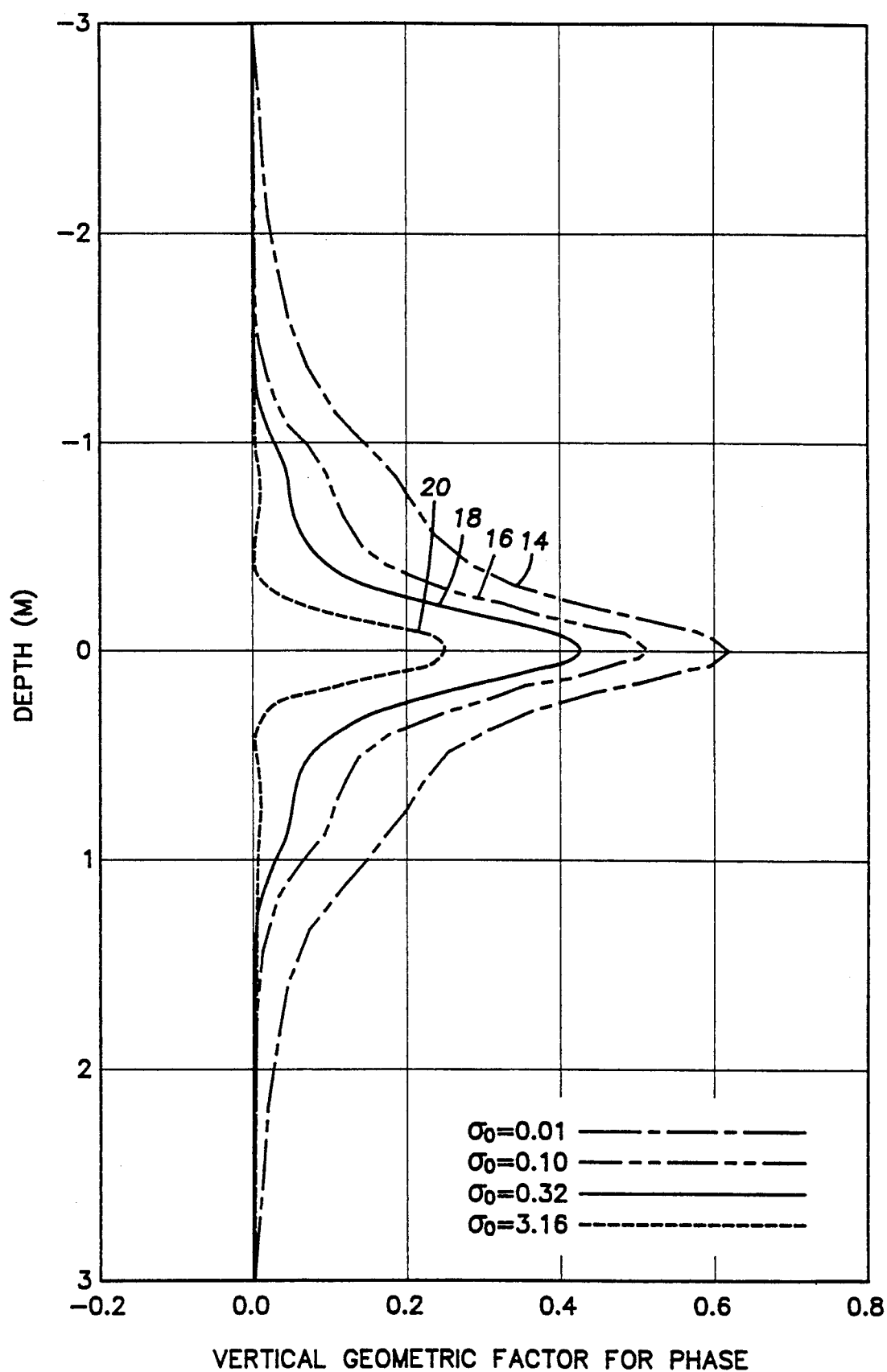
FIG. 2 shows the VGF impulse response for phase for the array of FIG. 1b, for four constant background formation conductivity values.

FIG. 2 is the phase impulse response for a two transmitter, two receiver system for four different formation conductivities, $\sigma_0$=0.01, 0.10, 0.32 and 3.16, represented by curves 14, 16, 18 and 20 respectively. From the response curves, one can appreciate that the response is broader at low conductivities than at high conductivity. Decreased vertical spatial resolution results for a resistive formation because the electromagnetic field penetrates further into more resistive formations than in a conductive formation.

With the VGF known from the impulse response curves of FIG. 2, it becomes possible to enhance and to reshape the tool responses to provide better vertical resolution and symmetric response characteristics. However, because the VGFs are dependent upon the background conductivity and the phase measurement is non-linear with respect to the formation conductivity, an adaptive deconvolution method is required.

Figure 3:
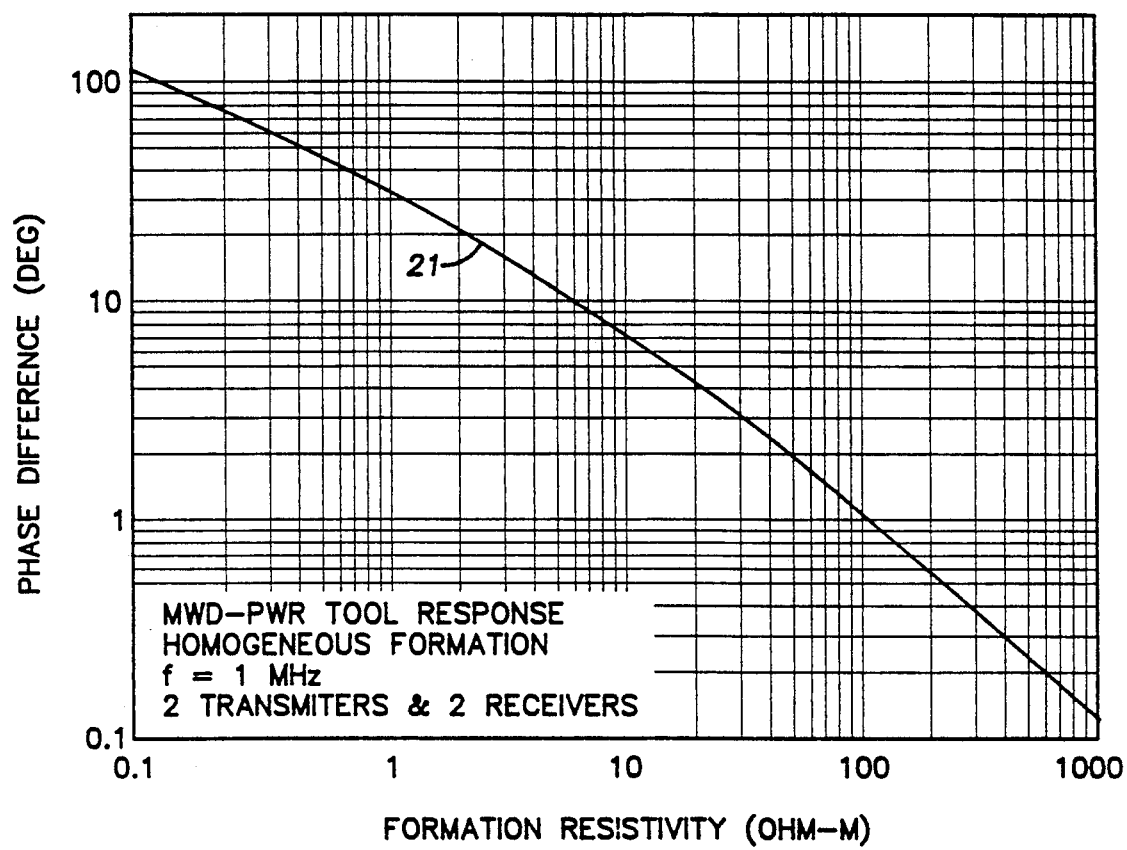
FIG. 3 is a graph of phase difference as a function of resistivity (conductivity$^{-1}$) in a homogeneous formation.

Equation (4) provides the VGF impulse response function necessary for deconvolution. In conventional induction logging, the apparent conductivity is derived by dividing the measured voltage by a normalizing constant. The nonlinear nature of the problem at high conductivity is corrected by application of a skin effect correction. In the propagated wave resistivity tool of this invention, the conversion from measured phase difference to apparent conductivity is made with the aid of the computed homogeneous formation phase response curve shown in FIG. 3. The nonlinear response in a homogeneous formation is inherently reflected in the conversion. The phase difference will be deconvolved to provide the argument entry for determining apparent conductivity according to the curve in FIG. 3. It will be assumed that conductivity is a function of z (depth) only and the tool will be assumed to be perpendicular to the layer surfaces.

The perturbation of the phase difference $\theta^S$ from $\theta_O$ which would exist in a particular background conductivity $\sigma_O$ can be shown to be $$\theta^S = C \int_{-\infty}^{\infty} [\tau(z') - \tau_0]g_v(z - z')dz' \quad (5)$$

In the Fourier domain, (5) becomes $$\Theta = C\Sigma G_v \quad (6)$$

where $\Theta$, $\Sigma$ and $G_v$ are the Fourier transforms of $\theta^S$, $\theta^S,[\sigma(z)-\sigma_O]$ and $g_v$ respectively.

Ideally, the conductivity can be derived from $$\Sigma = \Theta/(CG_v). \quad (7)$$

Formulation (7) turns out to be unstable due to physical tool-measurement limitations. Preferably, a suitable low-pass filter such as Gaussian filter function, T, but not limited thereto, is introduced to band-limit the deconvolution as follows:

$$\Sigma T = \left(\frac{\Theta}{C}\right)\left(\frac{T}{G_v}\right) \quad (8)$$

The half-width of the filter function is adjusted based upon prior experience in the region under study, to control the vertical resolution enhancement. In (8) the adaptive deconvolution filter function in the Fourier domain is $T/G_v$. Its inverse transform is the space domain deconvolution filter.

In operation, as the tool is drawn through a borehole drilled into a formation of interest, the transmitters are alternately excited to transmit an electromagnetic wave past the receiver coils. The phase difference between the voltages induced in the receiver antennas are measured at a plurality of different levels and recorded by a suitable recording means of any well known type (not shown). A plurality of phase VGF's or impulse response curves are precalculated for a range of conductivities that are expected to be encountered in earth formations. Typical curves such as shown in FIG. 2 may be generated for a plurality of different estimated conductivities. A corresponding plurality of exemplary deconvolution filters are created from the precalculated phase impulse response functions. Next, the measured phase differences are averaged over a spatial interval corresponding to the formation volume in which the tool is currently located and to which the tool is responsive to provide an average background phase value within the formation volume of interest. Preferably the measurements are weighted prior to averaging by application of weighting coefficients derived from some desired function that may be Gaussian but is not limited thereto. A new deconvolution filter that is appropriate to the current formation volume is computed by interpolating between the plurality of exemplary deconvolution filters. The current phase measurements are deconvolved with the aid of the new deconvolution filter. Shaping operators such as a Hamming or a Blackman window may be applied to the data set to minimize side lobes. The process is repeated for other levels in the borehole.

The deconvolution process is adapted to the changing parameters along the borehole by choosing an appropriate deconvolution filter that depends upon the weighted conductivity around each depth level of interest.

Figure 4:
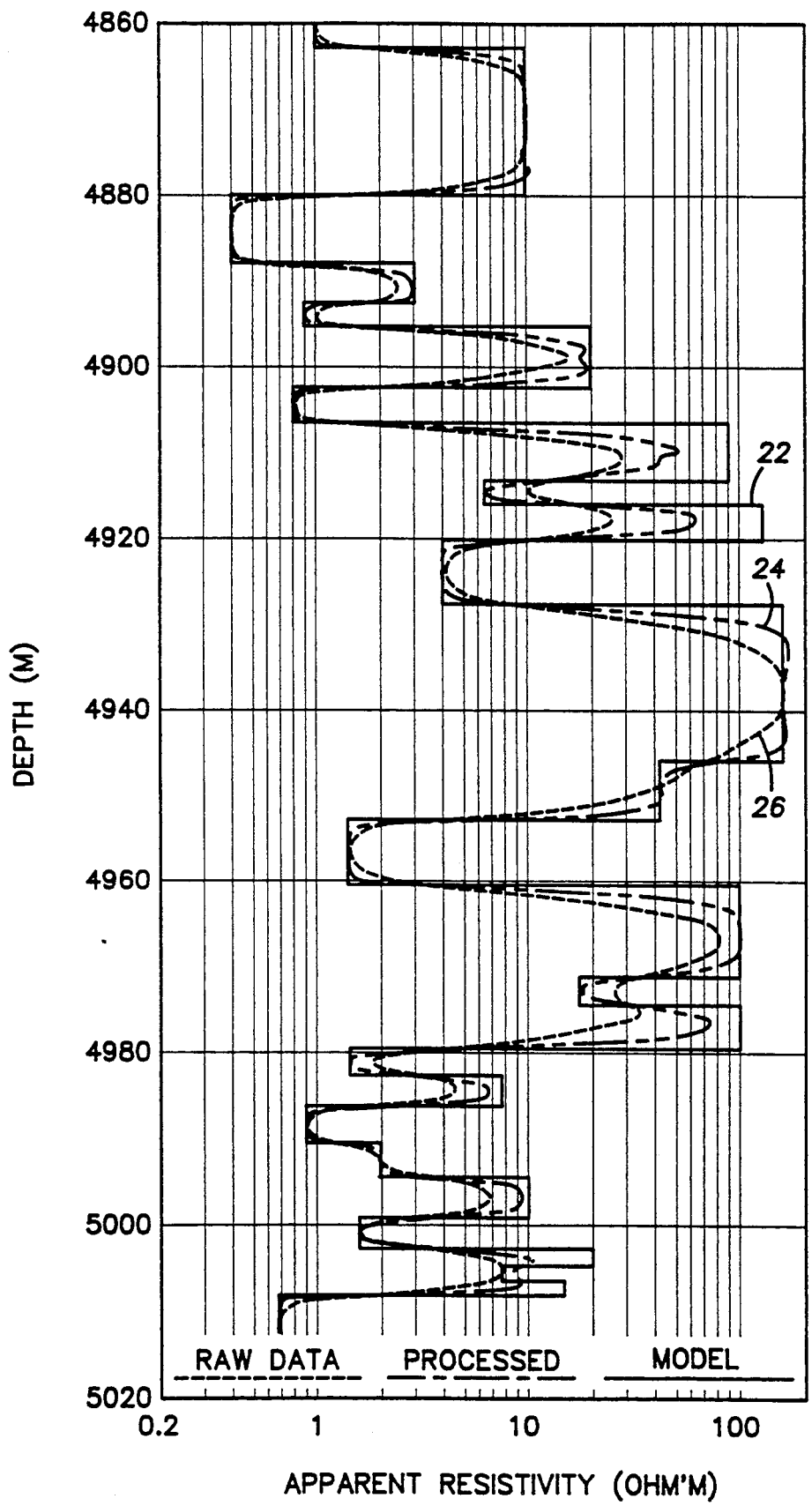
FIG. 4 shows the vertical resolution enhancement for a sequence of formation beds.

FIG. 4 is a showing of the vertical resolution enhancement for a model of a sequence of formation beds. The coordinates are a linear vertical depth scale vs. apparent resistivity in ohm-meters on a logarithmic scale. The solid lines 22 represent the model (true) formation layers; the short dashed lines 26 depict the raw data; the broken lines 24 are the results of applying the teachings of this invention.

This invention has been described with a certain specificity by way of example but not by way of limitation. Those skilled in the art will consider other techniques for performing the disclosed process which will fall within the scope and spirit of this invention which is limited only by the appended claims.

What is claimed is:

1. A method for enhancing the vertical resolution of the impulse response of a propagated wave resistivity tool positioned in a borehole that is drilled through a formation of interest, said tool including a transmitter antenna and two spaced-apart receiving antennas that are disposed remotely from said transmitter antenna, comprising the steps of:
   (a) measuring, over a preselected interval in said borehole, the phase difference between the voltages induced in said spaced-apart receiving antennas by an electromagnetic wave transmitted through said formation from said transmitter antenna;
   (b) adaptively deconvolving said phase difference measurements, the step of adaptively deconvolving including the steps of
      (i) predefining a plurality of phase impulse responses for a corresponding plurality of formation conductivities within a range of values expected to be encountered in said borehole,
      (ii) deriving a plurality of exemplary deconvolution filters from said impulse responses,
      (iii) averaging the phase measurements over a spatial interval corresponding to the current formation volume in which said tool is located and to which said tool is responsive, thereby to define an average background phase,
      (iv) computing a new deconvolution filter appropriate to said average background phase by interpolating between said plurality of exemplary deconvolution filters,
      (v) with the aid of said new deconvolution filter, deconvolving said phase measurements for said current formation volume.

2. The method as defined by claim 1, including the step combining a band-limiting filter function with said new filter.

3. The method as defined by claim 2, comprising applying desired weighting coefficients to said phase measurements prior to averaging.

4. The method as defined by claim 3, comprising:
converting the deconvolved phase measurements for said current formation volume to an apparent resistivity function characteristic of said current formation volume.

5. The method as defined by claim 4, comprising repeating steps (b)(i)–(b)(v) for a plurality of other preselected depth levels in said borehole.

6. A method for enhancing the vertical resolution of the impulse response characteristics of a propagated wave resistivity tool, said tool including at least one transmitting antenna mounted thereon and two spaced-apart receiver antennas remotely located along the length of said tool, said tool being positioned in a borehole drilled through a formation of interest, comprising the steps of:
   (a) from a first depth level in said borehole, launching an electromagnetic field from said transmitter antenna;
   (b) receiving by said receivers, the electromagnetic field after passage through the formation volume in which said tool is currently positioned;
   (c) measuring the phase differences between the voltages induced in said receiver antennas by said electromagnetic field over a spatial interval corresponding to the current formation volume;
   (d) computing a plurality of phase impulse responses corresponding to a plurality of discrete formation conductivities over a range of values expected to be encountered within the formations penetrated by said borehole;

(e) deriving a plurality of exemplary deconvolution filters from said plurality of impulse responses;

(f) averaging the measured phase differences over the formation volume to which the tool is currently responsive to provide an average background phase value;

(g) using said average background phase value, interpolating between said plurality of exemplary deconvolution filters to define a current deconvolution filter; and (h) spatially deconvolving said measured phase differences using said current deconvolution filter.

7. The method as defined by claim 6, comprising applying selected weighting coefficients to said measured phase differences.

8. The method as defined by claim 7, comprising:
converting the weighted spatially deconvolved phase difference measurements to an apparent resistivity function corresponding to said current formation volume.

9. The method as defined by claim 8, comprising repeating the steps of launching, receiving, measuring, averaging, interpolating and deconvolving for other depth levels in said borehole.

* * * * *